United States Patent Office 3,682,858
Patented Aug. 8, 1972

3,682,858
THERMOSETTING COMPOSITION HAVING THERMOPLASTIC CHARACTER
Raymond S. Shank, Brecksville, Ohio, Vernon H. Kallenborn, Winona, Minn., and Alice W. Kennedy, Northfield, Ohio, assignors to The Standard Oil Company, Cleveland, Ohio
No Drawing. Continuation-in-part of application Ser. No. 651,394, July 6, 1967. This application Mar. 18, 1970, Ser. No. 20,843
Int. Cl. C08k 1/02
U.S. Cl. 260—40 R          9 Claims

ABSTRACT OF THE DISCLOSURE

A thermosetting resin composition which is composed of an ethylenically unsaturated polymerizable polyester, diallyl phthalate, N-t-octyl acrylamide and optionally fillers, pigments and reinforcing agents is described.

---

This is a continuation-in-part of our co-pending U.S. patent application Ser. No. 651,394, filed July 6, 1967, now abandoned.

The present invention relates to a thermosetting plastic composition composed of an ethylenically unsaturated, polymerizable alkyd resin, diallyl phthalate, N-t-octyl acrylamide and optionally fillers, pigments and reinforcing agents.

It is well known that thermosetting resins have many desirable properties, particularly in the finished articles prepared therefrom, but that these resins are not easy to fabricate and that they lack many of the desirable handling and flow properties inherent in many thermoplastic resins. It would be highly desirable to obtain a composition and process which combined the ease of fabrication of thermoplastics with the high performance of thermosetting plastics in the end product.

It is, therefore, an object of this invention to provide thermosetting resin compositions which can be handled in solid form such as thermoplastic materials are handled. Another object is the provision of thermosetting resins which, in an intermediate stage before final cure, are thermoplastic in nature and have excellent flow properties at slightly elevated temperatures. Another object is the provision of thermosetting resins which may be reinforced and which can be molded to any desired shape at slightly elevated temperatures and further molded and caused to flow readily at higher temperatures before the thermoset reaction occurs to produce a final thermoset article having excellent physical properties. It is still another object to provide a novel thermoplastic composition which has excellent shelf life and can be handled in a conventional manner as thermoplastics are handled and ultimately can be converted to a reinforced thermoset article in conventional molding and forming equipment normally used in the handling of thermoplastic resins. Another object is the provision of a flexible, thermoplastic structure which can be readily molded, drawn and cured to produce a reinforced thermoset structure. It is also an object to provide rigid, reinforced, thermoset articles of many shapes and sizes which have excellent physical and chemical properties by relatively simple procedures. That the foregoing and other objects have been accomplished will become apparent to those skilled in the art from the following description and illustrative examples.

The thermosetting resins of this invention, which may be reinforced by the inclusion of fibers in them, can be provided to fabricators in intermediate, uncured form which can be used to produce the thermoset end product in a final forming operation in which the thermoset or cross-linking reaction occurs.

The thermosetting compositions of this invention which can be handled as thermoplastic resins in a conventional manner and are convertible to reinforced thermoset articles in conventional thermoplastic handling equipment are composed of (A) a thermosetting synthetic alkyd resin, (B) diallyl phthalate, (C) N-t-octyl acrylamide, (D) randomly dispersed reinforcing fibers, and (E) a particulate, granular filler wherein there is present from about 30 to 70% by weight of component (A), from 5 to 35% by weight of component (B) and from 10 to 65% by weight of component (C) based on the combined weights of (A)+(B)+(C); from 0 to 70% by weight of component (D) based on the combined weights of (A)+(B)+(C)+(D)

and from 0 to 75% by weight of component (E) based on the combined weights of (A)+(B)+(C)+(E). It is also most preferred that there be present in the thermosetting resin composition embodied herein from about 50 to 60% by weight of component (A), from 25 to 35% by weight of component (B) and from 10 to 25% by weight of component (C) based on the combined weights of (A)+(B)+(C); from 10 to 60% by weight of component (D) based on the combined weights of (A)+(B)+(C)+(D)

and from 35 to 50% by weight of component (E) based on the combined weights of (A)+(B)+(C)+(E).

Component (A), the thermosetting alkyd resin, is a material resulting from the reaction of polyhydric alcohols and resinifying carboxylic acids, such as polybasic acids and their anhydrides.

The preferred polyesters or alkyd resins in the present invention are those containing sufficient olefinic unsaturation so as to be thermosetting, and this olefinic unsaturation should be present in the polyesters in the form of unsaturated dibasic acid moieties. The other portions of the preferred polyester molecules may be composed of saturated dibasic acid, aliphatic polyhydric alcohol and aromatic polyhydric alcohol moieties. Illustrative unsaturated dibasic acids and anhydrides, saturated dibasic acids and anhydrides, aliphatic polyhydric alcohols and aromatic polyhydric alcohols useful in the preparation of the preferred polyesters of the present invention include the following:

Unsaturated dibasic acids and anhydrides maleic acid
chloromaleic acid
ethyl maleic acid
maleic anhydride
citraconic anhydride
muconic acid
fumaric acid
aconitic acid
mesaconic acid
itaconic acid
tetrahydro phthalic acid Saturated dibasic acids and anhydrides adipic acid
azelaic acid
sebacic acid
dodecyl succinic acid
succinic acid
tetrachlorophthalic anhydride
phthalic anhydride
phthalic acid
isophthalic acid
hexahydro phthalic anhydride
maleic acid
citric acid Aliphatic polyhydric alcohols ethylene glycol
propylene glycol
trimethylene glycol
triethylene glycol
pentaethylene glycol
polyethylene glycol
1,4-butanediol
diethylene glycol
dipropylene glycol
2,2-dimethyl-1,3-propanediol
hexamethylene glycol
1,4-cyclohexane dimethanol Aromatic polyhydric alcohols xylene alcohols
ethyl resorcinol
propyl resorcinol
2,4-dimethyl resorcinol
3,6-dimethyl-1,2,4-benzenetriol
ethyl pyrogallol
2,4-methyl-1,4-dihydroxy naphthalene
3-methyl-1,4,5-naphthalene triol
dimethylol toluene
dimethylol xylene
bis-hydroxy ethyl or bis-hydroxy propyl ethers of resorcinol, catechol, hydroquinones
1,5-dihydroxy naphthalene
4,4'-isopropylidene-bis-phenol, etc.

The use of the so-called flame-resistant, olefinically unsaturated polyesters prepared from halogen-containing polybasic carboxylic acids and from halogen-containing polyhydric alcohols is within the scope of the present invention.

Component (B) is diallyl phthalate and preferably is diallyl o-phthalate having the formula

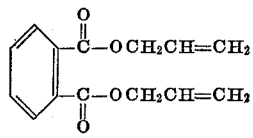

Component (C) is N-t-octyl acrylamide which may be prepared by the reaction of alpha-diisobutylene and acrylonitrile in the presence of strong sulfuric acid by known procedures. N-t-octyl acrylamide has the structure

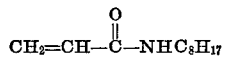

which is composed substantially of

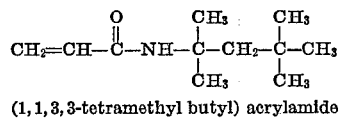

(1,1,3,3-tetramethyl butyl) acrylamide

The (D) component of the thermoplastic composition embodied herein may be any fiber, natural or artificial, or combinations of natural and artificial. The term "fiber" as used herein includes naturally occurring materials such as cotton, flax, hemp, wool, hair and silk, and includes long, thin objects which besides their filiform shape possess considerable tensile strength, toughness and flexibility. The term "fiber" also includes products of non-natural origin, such as viscose rayon and acetate rayon, nylon, Orlon, Vinyon, Saran, arolac, Ardil, Dacron and Vicara. Some of these man-made fibers, for example, viscose rayon, and the various respun protein fibers, such as arolac (from casein), Ardil (from peanuts) and Vicara (from zein), are of a "half-synthetic" character.

There exist in nature also fibrous materials of inorganic character, such as asbestos and other silicates, and there are many inorganic substances which may be processed into fiber forms such as steel, aluminum, tungsten, molybdenum, carbon, aluminum silicate, graphite, rock wool, tantalum, quartz and glass. The modulus of elasticity (Young's modulus) is an important quantity in characterizing a fiber, yarn or cord; it represents its stiffness by measuring the initial resistance against extension. Preferred in the instant invention are fibers having a modulus of elasticity of more than about $50 \times 10^5$ p.s.i. and more preferred are those fibers having a modulus of elasticity in excess of about $200 \times 10^5$ p.s.i. Such fibers include those of steel, quartz, glass and the like. Fibers of glass are most preferred in the present invention.

The fibers useful herein may be employed in a random manner, preferably in the form of chopped roving or chopped strand mat therefrom as distinguished from the continuous filament and woven forms of fiber. The size of the cross-section of the individual fibers useful herein is not critical, the only requirement being that they be in the fiber range. The fibers useful herein may also have coated surfaces for improvement of their physical and chemical properties. Chrome-finish or silane-finish glass fibers, for instance, are representative of coated fibers which are useful in the present invention.

Component (E) is an inorganic, granular, particulate solid which may be one or more of such a material, including alumina, silica, titania, zirconia, alkaline earth carbonates such as calcium carbonate, clay, diatomaceous earth, fuller's earth, antimony oxide and the like.

It is preferred that the thermoplastic compositions of this invention also include a polymerization catalyst or free radical initiator and preferably one which generates free radicals only at higher temperatures.

Among the polymerization catalysts useful in the present invention are included super peroxides such as barium peroxide, sodium peroxide, ozone, etc.; symmetrical diacyl peroxides such as acetyl peroxide, lauroyl peroxide, benzoyl peroxide, succinyl peroxide, anisoyl peroxide, etc.; tertiary butyl perbenzoate, tertiary butyl hydroperoxide, furoyl peroxide, cumene hydroperoxide, toluyl hydroperoxide, cyclohexyl hydroperoxide, p-bromobenzoyl hydroperoxide, terpene peroxides such as pinane hydroperoxide and p-methane hydroperoxide, peroxides of the drying oils such as those formed upon oxidation of linseed oils, etc.; various other per compounds such as perborates, perchlorates, ozonides, etc.; dialkyl peroxides such as ditertiary butyl peroxide, dicumyl peroxide, methyl ethyl ketone peroxide and free radical producing agents such as 1,1,2,2-tetra-ethyl - 1,2 - diphenylethane, alpha - methylalpha-ethyl, beta - methyl - beta - ethyl - alpha,beta-diphenylethane, etc. The use of radiant energy such as nuclear radiation, X-rays, beta-rays, ultraviolet and infrared radiation and the like for initiation of the cure is also within the scope of the present invention.

The process for preparing the final cured, reinforced plastic compositions embodied herein usually consists of three main steps. In the first step, ethylenically unsaturated alkyd resin, the diallyl phthalate, the t-octyl acrylamide, the filler and the fiber are mixed by suitable mixing means. It is also sometimes preferred to blend one or all of the resinous and monomeric materials and filler to get a mix of a desired viscosity and then to add the fibers to the resin-monomer mix. The stabilizers, activators and catalyst are also added to the mix; however, it is generally preferred to add the catalyst as the last ingredient.

Secondly, the coherent mixture obtained from the first step can be sheeted out on a calender or similar device; or it may be pressed into sheets or other shaped articles at a temperature of from about 240–270° F.

In an alternative procedure to the first two steps given above, the various resin and fiber ingredients are mixed by air layering onto a screen or other porous base and the resulting loosely packed sheet is then compressed and partially fused in a suitable apparatus such as a Rotocure, calender or similar device to form a thermoplastic structure.

In the third step the structure is formed and cured at a temperature of from 250 up to 400° F. and preferably at about 300° F. This step may be performed by the forming and partial curing of a structure in the mold followed by a post cure out of the mold in a suitable heating area such as in an oven.

In the following illustrative examples, the amounts of ingredients used are expressed as parts by weight unless otherwise indicated.

EXAMPLE 1

Resin mixtures including filler, catalyst, pigment and release agent were prepared employing the following ingredients:

|  | A | B | C | D | E |
|---|---|---|---|---|---|
| Unsaturated alkyd resin (maleic, isophthalic, propylene glycol polyester) | 66.6 | 64.7 | 60.0 | 57.0 | 49.2 |
| t-Octyl acrylamide | 33.3 | 32.3 | 30.0 | 28.5 | 24.6 |
| Diallyl phthalate |  | 3.1 | 10.0 | 14.5 | 32.8 |

The unsaturated alkyd resin of this example contains a mole ratio of isophthalic to maleic groups of about 1:1 and is a solid at room temperature and has a molecular weight of about 3500, an acid number of 10±2 and a hydroxyl number of 20±2. In each of A–E there was included 200 parts of alumina filler, 2 parts of dicumyl peroxide, 6 parts of zinc stearate and 3 parts of red pigment.

In each case all of the components of the mixture except the diallyl phthalate were placed in a high shear internal mixer. The components were agitated for a period of four minutes in order to reduce the particle size of some of the original components and to obtain a uniform blend. At this point the diallyl phthalate was added over a 45-second period. When the diallyl phthalate had all been added, the velocity of the mixing blade was increased, and the mixing was stopped shortly and the resin mix was dumped and cooled rapidly with Dry Ice. The dump temperature varied from about 150 to 190° F.

The resin mixes thus prepared were tested in a special flow test mold press to determine their flow properties. The test samples were subjected to the special flow test at 325° F. and 180 p.s.i. The results of this test are expressed as spiral flow in inches.

Spiral flow, inches
A ------------------------------------------------ 20.75
B ------------------------------------------------ 17.5
C ------------------------------------------------ 26.5
D ------------------------------------------------ 32.5
E ------------------------------------------------ 43.0

The resin mix prepared as above was in the form of a relatively non-tacky, granular, particulate solid material. The granular resin mix was then pulverized and sieved to remove all particles larger than 16 mesh.

The sieved resin mix was next combined with randomly dispersed chopped glass fibers in a mat forming machine and pressed to form a uniform sheet molding compound in the form of a flat panel by passing the formed mat through a calender having warm rolls. Each panel was then molded and cured under the following conditions:

Cure time: 5 minutes
Cure pressure: 600 p.s.i.
Cure temperature: 300–310° F.
Charge weight: 500 grams
Charge shape: 7 plies, each 7¾" x 15¾"
Die: 8" x 16" tray mold
Final mold close rate: ½" in 25 seconds In this instance the flow of the resin and glass fiber was held to a minimum. The properties of these panels were then tested with the following results:

| Resin | Room temperature | | 180° F. flexural strength ×10³ p.s.i. | Percent glass |
|---|---|---|---|---|
|  | Flexural strength ×10³ p.s.i. | Tensile strength ×10³ p.s.i. |  |  |
| A | 26.3 | 12.9 | 10.3 | 32.1 |
| B | 23.8 | 11.5 | 11.1 | 34.7 |
| C | 32.8 | 15.9 | 14.9 | 32.9 |
| D | 31.8 | 16.1 | 17.3 | 32.2 |
| E | 31.7 | 15.0 | 17.3 | 33.9 |

EXAMPLE 2

A series of moldings were made using the combined resin mix-chopped glass fiber sheet molding compounds described in Example 1. The mold used was an 8" x 16" tray mold, and the sheet molding compound having the dimensions 4" x 8" and made up of 26 plies was placed at one end of the mold and thus it was necessary for a flow of 12 inches to completely fill the mold. The molding conditions were as follows:

Preheat: 4 minutes at 200° F.
Mold temperature for molding: 300–310° F.
Cure time: 5 minutes
Cure pressure: 600 p.s.i.
Final mold close rate: ¾" in 25 seconds The press used was a 150-ton capacity press.

Samples A and B did not flow enough to completely fill the mold under these conditions whereas samples C, D and E flowed and filled the mold uniformly.

EXAMPLE 3

Two resin mixtures were made to compare directly the flow properties of the resins of the present invention (A) with those of resins (B) according to U.S. Pat. No. 3,305,514.

|  | A | B |
|---|---|---|
| Polyvinyl chloride |  | 16.9 |
| Vinyl chloride-vinyl acetate (88–12) copolymer |  | 5.6 |
| Aluminum silicate | 88.9 | 88.7 |
| N-t-octyl acrylamide | 17.7 | 17.7 |
| Zinc stearate | 1.4 | 1.4 |
| Dibasic lead phosphite (vinyl stabilizer) |  | 1.1 |
| Polyester (molecular weight 1,200, from orthophthalic anhydride, maleic anhydride and propylene glycol) | 35.4 | 35.4 |
| Diallyl phthalate | 5.9 | 5.9 |
| Dicumyl peroxide | 0.7 | 0.7 |

The mixtures were prepared by mixing the foregoing ingredients in each recipe in a Prodex-Henschel mixer, model 2JSS. Both mixtures were granular, slightly tacky solids.

The flow properties of each of the above mixes were determined by first preparing a pill-shaped disc from the given mixture by placing 15 grams of the resin into a cold disc mold that had a diameter of 2 inches. The mold was then inserted into a cold press and a pressure of 10,000 p.s.i. was applied to the mold. The pressure was maintained for about one minute, the pressure was released and the mold was removed from the press. The disc-shaped resin sample was then carefully removed from the mold and was placed between two sheets of cellophane and put in the exact center of a Pasadena model PW–220 press having two 8" x 12" platens. The temperature of the platens was brought to 325° F. and maintained at this temperature before and during the time the sample was in the press. The platens of the press were then brought together on the sample rapidly and a 5,000 p.s.i. pressure was maintained on the platens. While the sample was flowing the pressure started to drop and was brought to and maintained at 5,000 p.s.i. manually. When a steady pressure of 5,000 p.s.i. was reached (it was no longer necessary to make manual adjustments to compensate for flow of the resin), the sample was allowed to stand for one minute at 5,000 p.s.i. and 325° F. The press was then opened and the sample was removed. The area of the pressed sheet of resin was then determined with a planimeter. An area of 65 square inches was observed for the resin A and an area of 44 square inches was found for resin B. Thus, it can be seen that the resin mixtures of this invention flow to a much greater extent than those of the prior art.

We claim:
1. The composition consisting essentially of an intimate mixture of
   (A) a thermosetting synthetic alkyd resin,
   (B) diallyl phthalate,
   (C) N-t-octyl acrylamide,
   (D) randomly dispersed reinforcing fibers selected from the group consisting of steel, quartz and glass, and
   (E) particulate solid filler selected from the group consisting of alumina, silica, titania, zirconia, alkaline earth carbonates, clay, diatomaceous earth, fuller's earth and antimony oxide, wherein there is present from 30 to 70% by weight of component (A), from 5 to 35% by weight of component (B), and from 10 to 65% by weight of component (C) based on the combined weights of (A)+(B)+(C); from 0 to 70% by weight of component (D) based on the combined weights of (A)+(B)+(C)+(D); and from 35 to 50% by weight of component (E) based on the combined weights of (A)+(B)+(C)+(E).

2. The composition of claim 1 wherein component (D) is a glass fiber.

3. The composition of claim 2 wherein component (E) is alumina.

4. A flexible, heat curable structure consisting essentially of a strong, flexible compressed mass of an intimate mixture of components
   (A) a thermosetting synthetic alkyd resin,
   (B) diallyl phthalate,
   (C) N-t-octyl acrylamide,
   (D) randomly dispersed reinforcing fibers selected from the group consisting of steel, quartz and glass, and
   (E) particulate solid filler selected from the group consisting of alumina, silica, titania, zirconia, alkaline earth carbonates, clay, diatomaceous earth, fuller's earth and antimony oxide, wherein there is present from 30 to 70% by weight of component (A), from 5 to 35% by weight of component (B), and from 10 to 65% by weight of component (C) based on the combined weights of (A)+(B)+(C); from 0 to 70% by weight of component (D) based on the combined weights of (A)+(B)+(C)+(D); and from 35 to 50% by weight of component (E) based on the combined weights of (A)+(B)+(C)+(E).

5. The structure of claim 4 wherein component (D) is a glass fiber.

6. The structure of claim 5 wherein component (E) is alumina.

7. The structure of claim 6 wherein there is present from 50 to 60% by weight of component (A), from 25 to 35% by weight of component (B) and from 10 to 25% by weight of component (C) based on the combined weights of (A)+(B)+(C); from 10 to 60% by weight of component (D) based on the combined weights of (A)+(B)+(C)+(D); and from 35 to 50% by weight of component (E) based on the combined weights of (A)+(B)+(C)+(E).

8. The cured structure of claim 4.

9. The cured structure of claim 7.

References Cited
UNITED STATES PATENTS

| | | | |
|---|---|---|---|
| 3,305,514 | 2/1967 | Tiffon et al. | 260—32.6 |
| 3,347,806 | 10/1967 | Zimmerman | 260—22 |

MORRIS LIEBMAN, Primary Examiner

S. M. PERSON, Assistant Examiner

U.S. Cl. X.R.

260—861, 870